(12) United States Patent
Selvaggi et al.

(10) Patent No.: US 7,680,920 B2
(45) Date of Patent: Mar. 16, 2010

(54) METHODS, SYSTEMS AND COMPUTER PROGRAM PRODUCTS FOR EVALUATING NETWORK PERFORMANCE USING DIAGNOSTIC RULES IDENTIFYING PERFORMANCE DATA TO BE COLLECTED

(75) Inventors: Christopher David Selvaggi, Cary, NC (US); Michael Tod Schumacher, Raleigh, NC (US); John Lee Wood, Raleigh, NC (US)

(73) Assignee: NetIQ Corporation, San Jose, CA (US)

( * ) Notice: Subject to any disclaimer, the term of this patent is extended or adjusted under 35 U.S.C. 154(b) by 1872 days.

(21) Appl. No.: 10/395,347

(22) Filed: Mar. 24, 2003

(65) Prior Publication Data

US 2004/0193709 A1  Sep. 30, 2004

(51) Int. Cl.
*G06F 15/173* (2006.01)
(52) U.S. Cl. .................. 709/224; 709/223
(58) Field of Classification Search .......... 709/223, 709/224
See application file for complete search history.

(56) References Cited

U.S. PATENT DOCUMENTS

| | | | |
|---|---|---|---|
| 5,838,919 A | 11/1998 | Schwaller et al. | 395/200.54 |
| 5,881,237 A | 3/1999 | Schwaller et al. | 395/200.54 |
| 5,937,165 A | 8/1999 | Schwaller et al. | 395/200.54 |
| 6,061,725 A | 5/2000 | Schwaller et al. | 709/224 |
| 6,397,359 B1 | 5/2002 | Chandra et al. | 714/712 |
| 6,408,335 B1 | 6/2002 | Schwaller et al. | 709/224 |
| 6,577,648 B1 * | 6/2003 | Raisanen et al. | 370/503 |
| 6,643,496 B1 * | 11/2003 | Shimoyama et al. | 455/69 |
| 7,523,504 B2 * | 4/2009 | Shah | 726/25 |
| 7,554,983 B1 * | 6/2009 | Muppala | 370/392 |
| 2002/0080388 A1 * | 6/2002 | Chrisop et al. | 358/1.15 |
| 2004/0136324 A1 * | 7/2004 | Steinberg et al. | 370/238 |
| 2006/0159025 A1 * | 7/2006 | Abdo et al. | 370/249 |
| 2007/0203674 A1 * | 8/2007 | Radulovic et al. | 702/189 |

OTHER PUBLICATIONS netIQ, User Guide, Vivinet™ Diagnostics.
NetIQ's VoIP Suite, http://www.netiq.com/voip/.

* cited by examiner

*Primary Examiner*—Nathan Flynn
*Assistant Examiner*—Mohamed Wasel
(74) *Attorney, Agent, or Firm*—Myers Bigel Sibley & Sajovec

(57) ABSTRACT

A path of a communication connection between a first node and a second node is determined. The path includes at least one connecting node. A first set of network performance data associated with the communication connection is obtained. Ones of a plurality of diagnostic rules is automatically evaluated based on the obtained first set of network performance data to identify a second set of network performance data to be collected.

47 Claims, 4 Drawing Sheets

METHODS, SYSTEMS AND COMPUTER PROGRAM PRODUCTS FOR EVALUATING NETWORK PERFORMANCE USING DIAGNOSTIC RULES IDENTIFYING PERFORMANCE DATA TO BE COLLECTED

FIELD OF THE INVENTION

The present invention, generally, relates to network communication methods, systems and computer program products and, more particularly, to methods, systems and computer program products for evaluating the performance of a network.

BACKGROUND OF THE INVENTION

Companies are often dependent on mission-critical network applications to stay productive and competitive. To achieve this, information technology (IT) organizations preferably provide reliable application performance on a 24-hour, 7-day-a-week basis. One known approach to network performance testing to aid in this task is described in U.S. Pat. No. 5,881,237 ("the 237 patent") entitled Methods, Systems and Computer Program Products for Test Scenario Based Communications Network Performance Testing, which is incorporated herein by reference as if set forth in its entirety. As described in the '237 patent, a test scenario simulating actual applications communication traffic on the network is defined. The test scenario may specify a plurality of endpoint node pairs on the network that are to execute respective test scripts to generate active traffic on the network. Various performance characteristics are measured while the test is executing. The resultant data may be provided to a console node, coupled to the network, which may also initiate execution of the test scenario by the various endpoint nodes. The endpoint nodes may execute the tests as application level programs on existing endpoint nodes of a network to be tested, thereby using the actual protocol stacks of such devices without reliance on the application programs available on the endpoints.

One application area of particular interest currently is in the use of a computer network to support voice communications. More particularly, packetized voice communications are now available using data communication networks, such as the Internet and intranets, to support voice communications typically handled in the past over a conventional switched telecommunications network (such as the public switched telephone network (PSTN)). Calls over a data network typically rely on codec hardware and/or software for voice digitization so as to provide the packetized voice communications. However, unlike conventional data communications, user perception of call quality for voice communications is typically based on their experience with the PSTN, not with their previous computer type application experiences. As a result, the types of network evaluation supported by the various approaches to network testing described above are limited in their ability to model user satisfaction for this unique application.

A variety of different approaches have been used in the past to provide a voice quality score for voice communications. The conventional measure from the analog telephone experience is the Mean Opinion Score (MOS) described in ITU-T recommendation P.800 available from the International Telecommunications Union. In general, the MOS is derived from the results of humans listening and grading what they hear from the perspective of listening quality and listening effort. A Mean Opinion Score ranges from a low of 1.0 to a high of 5.0.

The MOS approach is beneficial in that it characterizes what humans think at a given time based on a received voice signal. However, human MOS data may be expensive and time consuming to gather and, given its subjective nature, may not be easily repeatable. The need for humans to participate as evaluators in a test every time updated information is desired along with the need for a voice over IP (VoIP) equipment setup for each such test contribute to these limitations of the conventional human MOS approach. Such advance arrangements for measurements may limit when and where the measurements can be obtained. Human MOS is also generally not well suited to tuning type operations that may benefit from simple, frequent measurements. Human MOS may also be insensitive to small changes in performance, such as those used for tuning network performance by determining whether or not an incremental performance change following a network change was an improvement.

Objective approaches include the perceptual speech quality measure (PSQM) described in ITU-T recommendation P.861, the perceptual analysis measurement system (PAMS) described by British Telecom, the measuring normalized blocks (MNB) measure described in ITU-T P.861 and the perceptual evaluation of speech quality (PESQ) described in ITU-T recommendation P.862. Finally, the E-model, which describes an "R-value" measure, is described in ITU-T recommendation G.107. The PSQM, PAMS and PESQ approaches typically compare analog input signals to output signals that may require specialized hardware and real analog signal measurements.

From a network perspective, evaluation for voice communications may differ from conventional data standards, particularly as throughput and/or response time may not be the critical measures. A VoIP phone call generally consists of two flows, one in each direction. Such a call typically does not need much bandwidth. However, the quality of a call, how it sounds, generally depends on three things: the one-way delay from end-to-end, how many packets are lost and whether that loss is in bursts, and the variation in arrival times, herein referred to as jitter.

Approaches for testing network performance are also discussed in commonly assigned U.S. patent application Ser. No. 09/479,523, filed on Jan. 7, 2000, commonly assigned U.S. patent application Ser. No. 09/951,050, filed on Sep. 11, 2001 and commonly assigned U.S. patent application Ser. No. 10/259,564, filed on Sep. 22, 2002, the disclosures of which are hereby incorporated herein by reference as if set forth herein in their entirety.

SUMMARY OF THE INVENTION

Embodiments of the present invention provide methods, systems and computer program products for evaluating network performance. A path of a communication connection between a first node and a second node is determined. The path includes at least one connecting node. A first set of network performance data associated with the communication connection is obtained. Ones of the plurality of diagnostic rules are automatically evaluated based on the obtained first set of network performance data to identify a second set of network performance data to be collected.

In some embodiments of the present invention, the second set of network performance data is obtained and ones of the plurality of diagnostic rules are automatically evaluated based on the second set of network performance data to identify a third set of network performance data to be collected. The evaluating and the identifying operations may be repeated until none of the plurality of rules identifying further network performance data to be collected is satisfied. At least one of the plurality of diagnostic rules may generate a network performance diagnosis when none of the plurality of rules identifying further network performance data to be collected is satisfied.

In further embodiments of the present invention, network traffic may be generated between the first node and the second node to obtain the first set of network performance data based on the generated network traffic. The network performance data may also be obtained from nodes of the path by polling at least one of the nodes of the path configured to receive queries while network traffic is being generated.

In still further embodiments of the present invention, a path of a communication connection may be determined by running a traceroute from the first node and the second node and running a traceroute from the second node to the first node.

In some embodiments of the present invention, a path of a communication connection may be determined by generating network traffic between the first node and the second node using a real-time transport protocol (RTP) datagram. The RTP datagram may include voice over internet protocol (VoIP) data.

In further embodiment of the present invention a path of a communication connection may be determined by utilizing an agent located on at least one of the nodes of the path and simple network management protocol (SNMP) queries. The connecting nodes of the path may be a router, a switch and/or a voice gateway.

In still further embodiments of the present invention, an agent located on a first one of the nodes of the path may send a query to a second one of the nodes of the path configured to receive queries to obtain network performance data associated with the second node of the path. The agent located on the first one of the nodes of the path may send a query to the second one of the nodes of the path using SNMP polling.

In some embodiments of the present invention, active traffic may be generated between the first and second nodes and the first set of network performance data may be calculated based on the generated traffic between the first and second nodes. The calculated first set of network performance data may include at least one of an end-to-end delay, an end-to-end jitter, an end-to-end jitter buffer loss, an end-to-end loss, an end-to-end mean opinion score, a delay across ones of the nodes of the path, a number of dropped packets for ones of the nodes of the path, a central processing unit utilization for ones of the nodes of the path and/or a memory utilization for ones of the nodes of the path.

In further embodiments of the present invention, ones of the plurality of diagnostic rules identifying further network performance data to be collected may include: if the path of a communication connection between the first node and the second node has been determined and end-to-end delay network performance data fails to meet a performance criteria, then poll ones of the nodes to obtain network performance data associated with the ones of the nodes; if at least one of the nodes of the path is located in a WAN, then poll the at least one of the nodes of the path for network performance data associated with the at least one node of the path; and if at least one valid node exists on the path of the communication connection, then obtain network performance data associated with the at least one valid node of the path.

In still further embodiments of the present invention, ones of the plurality of rules that generate a performance diagnosis when none of the plurality of rules identifying further network performance data to be collected is satisfied may include, but are not limited to, if a path has been determined and the end-to-end does not satisfy a performance criteria, then diagnose an end-to-end delay problem; if obtained network performance data fails to satisfy a performance criteria associated with end-to-end jitter buffer loss, then diagnose an end-to-end jitter buffer loss problem; if obtained network performance data fails to satisfy a performance criteria associated with end-to-end MOS, then diagnose an end-to-end MOS problem; if obtained network performance data fails to satisfy a performance criteria associated with end-to-end jitter, then diagnose an end-to-end jitter problem; if obtained network performance data fails to satisfy a performance criteria associated with end-to-end loss, then diagnose an end-to-end loss problem; if the network performance data associated with the at least one valid node of the path has been obtained and the network performance data associated with the at least one valid node of the path fails to satisfy a configuration criteria, then diagnose bad configuration settings associated with the at least one valid node of the path that fails to satisfy a configuration criteria; if the polling of ones of the nodes of the path has been completed and network performance data associated with the ones of nodes of the path fails to satisfy an associated performance criteria, then diagnose loss rate network performance data associated with ones of the plurality of nodes as failing to satisfy the associated performance criteria; if the polling of ones of the nodes of the path has been completed and network performance data associated with the ones of nodes of the path fails to satisfy an associated performance criteria, then diagnose bandwidth network performance data associated with ones of the plurality of nodes as failing to satisfy the associated performance criteria; and if the polling of ones of the nodes of the path has been completed and network performance data associated with the ones of nodes of the path fails to satisfy an associated performance criteria, then diagnose queue length network performance data associated with ones of the plurality of nodes as failing to satisfy the associated performance criteria.

While described above primarily with reference to methods, systems and computer program products are also provided in accordance with further embodiments of the present invention.

DETAILED DESCRIPTION OF THE INVENTION

Figure 1:
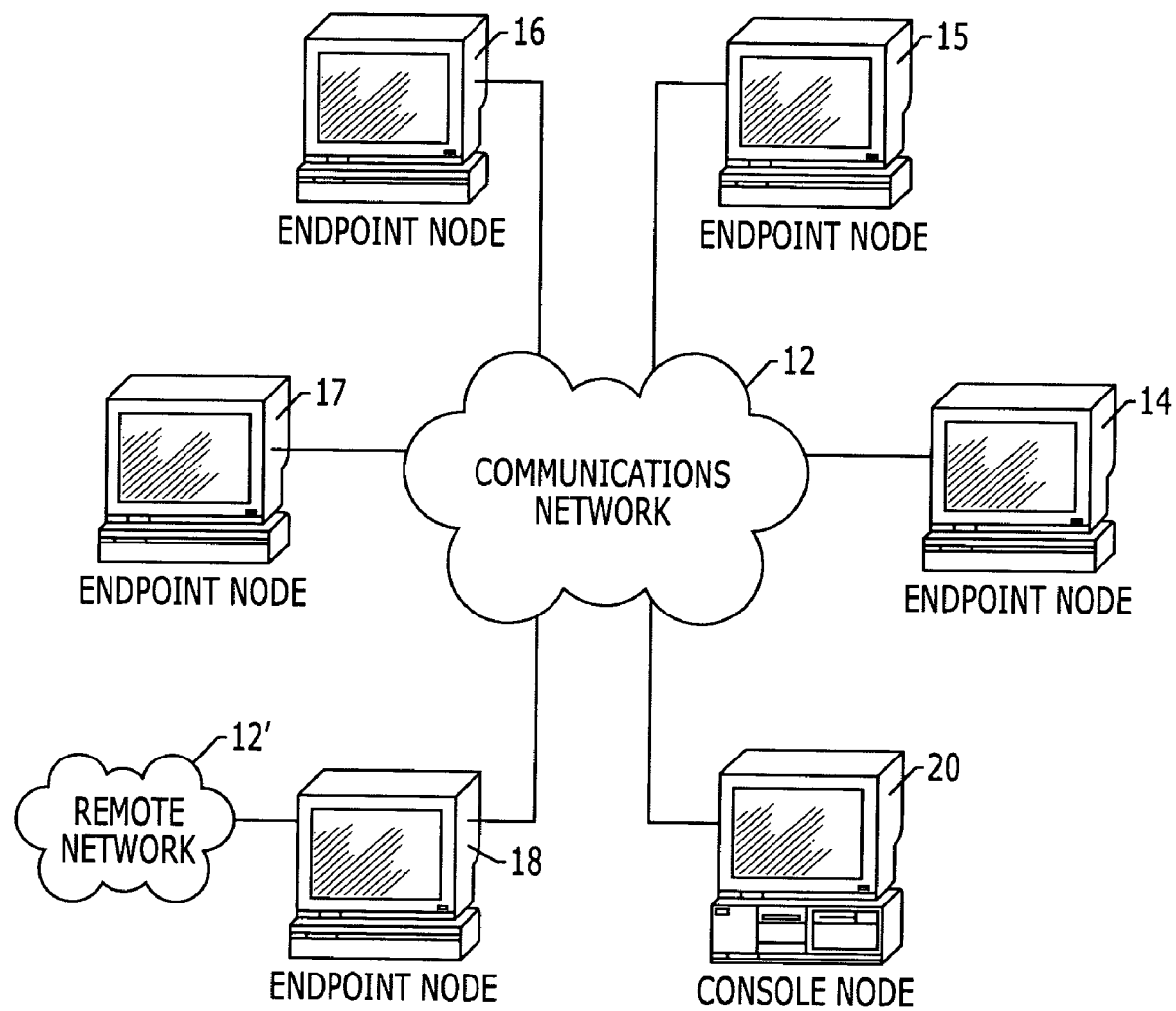
FIG. 1 is a block diagram of a hardware and software environment in which the present invention may operate according to some embodiments of the present invention.

The present invention now will be described more fully hereinafter with reference to the accompanying drawings, in which preferred embodiments of the invention are shown.

This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code means embodied in the medium. Any suitable computer readable medium may be utilized including hard disks, CD-ROMs, optical storage devices, or magnetic storage devices.

Computer program code for carrying out operations of the present invention may be written in an object oriented programming language, such as Java® or C++. However, the computer program code for carrying out operations of the present invention may also be written in conventional procedural programming languages, such as the "C" programming language or assembly language. Furthermore, the computer program code for carrying out operations of the present invention may be written in rule based programming languages, such as Eclipse from The Haley Enterprise. The program code may execute entirely on the user's computer, partly on the user's computer, as a stand alone software package, partly on the user's computer and partly on a remote computer, or entirely on the remote computer. In the latter scenario, the remote computer may be connected to the user's computer through a local area network (LAN) or a wide area network (WAN).

The present invention is described below with reference to flowchart illustrations and/or block diagrams of methods, apparatus (systems) and computer program products according to some embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flowchart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the acts specified in the flowchart and/or block diagram block or blocks.

Embodiments of the present invention will now be described with respect to FIGS. 1 through 7 below. Embodiments of the present invention provide methods, systems and computer program products for evaluating network performance using diagnostic rules. Network performance data, including, but not limited to, delay, jitter, jitter buffer loss, loss and mean opinion scores (MOSs), may be obtained by generating simulated network traffic on a known path and/or by polling the nodes of the path using, for example, simple network management protocol (SNMP) polling. The generated network traffic may include Real-time Transport Protocol (RTP) datagrams that include voice over IP (VoIP) data to evaluate the performance of the network when carrying packetized voice traffic. A plurality of diagnostic rules may be automatically evaluated based on the obtained performance data to identify a next set of network performance data to be collected. Additional network performance data may continue to be collected until none of the plurality of rules identifying further network performance data to be collected is satisfied. The collected network performance data may be used to generate a network performance diagnosis. This diagnosis may enable users to identify, for example, specific problems in existing or future networks and which nodes in the network are causing these problems. Accordingly, a diagnosis according to some embodiments of the present invention may expedite troubleshooting of networks.

Referring first to FIG. 1, embodiments of communications systems according to some embodiments of the present invention will now be described. More particularly, a hardware and software environment in which the present invention can operate will be described. The present invention includes methods, systems and computer program products for evaluating network performance of a communications network 12. The communications network 12 provides a communication link between a series of endpoint nodes 14, 15, 16, 17, 18 supporting, for example, packetized voice and/or video communications, and further provides a communication link between the endpoint nodes 14, 15, 16, 17, 18 and the console node 20.

As will be understood by those having skill in the art, a communications network 12 may include a plurality of separate linked physical communication networks, which, using a protocol such as the Internet protocol (IP), may appear to be a single seamless communications network to user application programs. For example, as illustrated in FIG. 1, the remote network 12' and the communications network 12 may both include a communication node at the endpoint node 18. Accordingly, additional endpoint nodes (not shown) on the remote network 12' may be made available for communications from the endpoint nodes 14, 15, 16, 17. It is further to be understood that, while for illustration purposes in FIG. 1 the communications network 12 is shown as a single network, it may be comprised of a plurality of separate interconnected physical networks. As illustrated in FIG. 1, the endpoint nodes 14, 15, 16, 17, 18 may reside on a computer. As illustrated by the endpoint node 18, a single computer may comprise multiple endpoint nodes for use in multiple networks (12, 12').

Performance evaluation of a network according to some embodiments of the present invention as illustrated in FIG. 1 may further include a designated console node 20. The present invention may evaluate the performance of the communications network 12 by the controlled execution of network traffic, for example, packetized voice and/or video type communication traffic, between the various endpoint nodes 14, 15, 16, 17, 18 on the communications network 12. It will be understood that network traffic may be simulated by endpoint node pairs or the console node 20 may perform as an endpoint node for purposes of a performance test/evaluation. It will be understood that any endpoint node may be associated with a plurality of additional endpoint nodes to define a plurality of endpoint node pairs. It will also be understood that a communication connection between endpoint nodes may include one or more connecting nodes and that a connecting node according to some embodiments of the present invention may act as an endpoint node for a particular test and/or communication connection in further embodiments of the present invention.

The various endpoint nodes 14, 15, 16, 17, 18 may be performance nodes, for example, NetIQ performance nodes. "Performance nodes" as used herein refer to nodes that may assist in gathering network performance data by sending simulated network traffic, for example, VoIP traffic, between two nodes of the network and taking performance measurements based on the simulated traffic. Performance nodes may be installed near, for example, soft phones, voice gateways, and servers in the network. It will be understood that some embodiments of the present invention use performance nodes and some embodiments of the present invention do not use performance nodes. Accordingly, the endpoint nodes 14, 15, 16, 17, 18 and the one or more connecting nodes of the present invention should not be limited to performance nodes. In further embodiments of the present invention, the endpoint nodes 14, 15, 16, 17, 18 chosen for a test may be, for example, VoIP phones. In these embodiments, performance nodes may be discovered in the same subnets as the VoIP phones and logically associated with the VoIP phones to facilitate testing of the path of a communication connection terminating at the VoIP phone.

The console node 20, or other means for controlling testing of network 12; obtains user input, for example, by keyed input to a computer terminal or through a passive monitor, to determine a desired test. The console node 20; or other control means further defines a test scenario to simulate network traffic between a plurality of selected endpoint nodes 14, 15, 16, 17, 18. Each endpoint node 14, 15, 16, 17, 18 may be provided endpoint node information, including an endpoint node specific network test protocol based on the network traffic expected, for example, VoIP traffic, to provide a test scenario which simulates network traffic. The console node 20 may construct the test scenario, including the underlying test protocols, and the console node 20; or other initiating means, may initiate execution of network test protocols for evaluating network performance. The console node 20 may also poll nodes of the path to obtain node (device) specific data according to some embodiments of the present invention.

Figure 2:
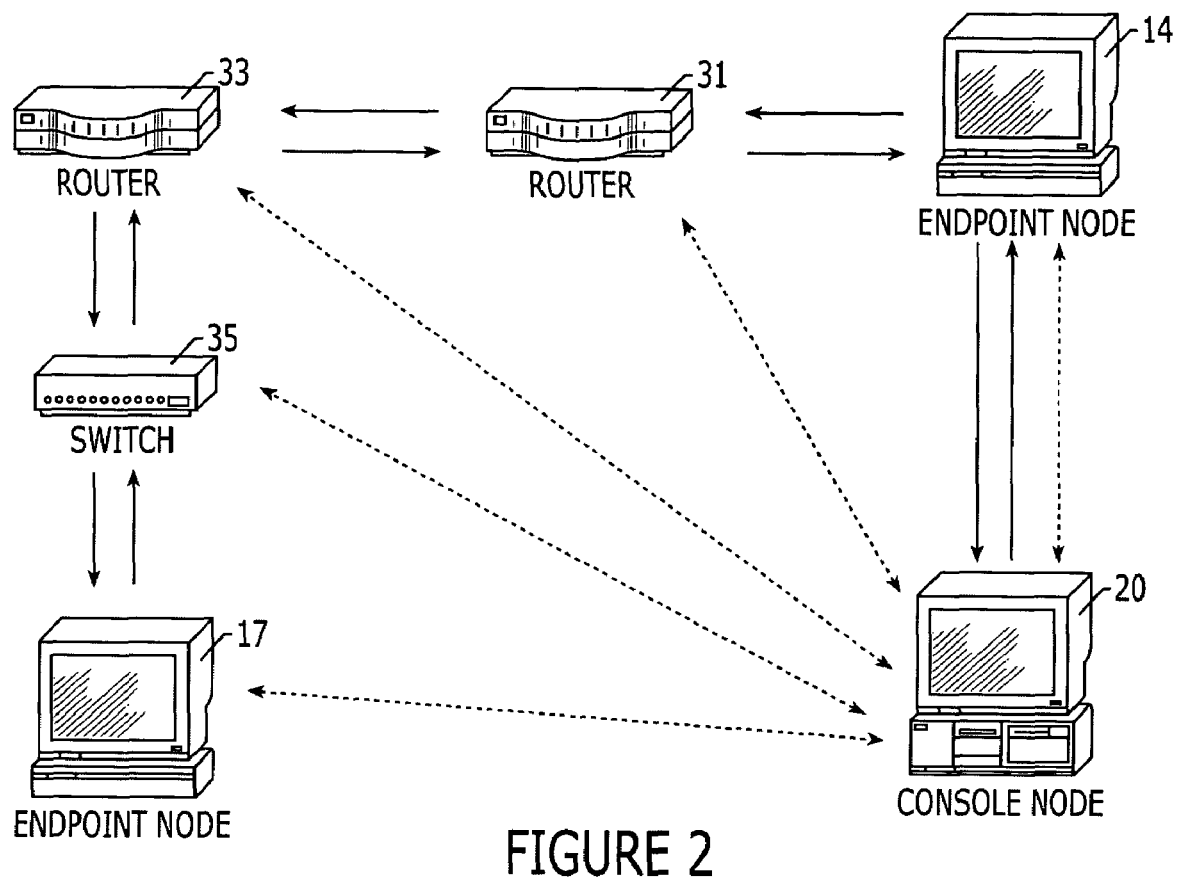
FIG. 2 is a more detailed block diagram of a hardware and software environment in which the present invention may operate according to some embodiments of the present invention.

In particular, the console node 20 may initiate a test protocol for a test that evaluates network performance according to some embodiments of the present invention. Once initiated, the test may be run between two selected nodes, a first node and a second node of the communications network 12. As illustrated in FIG. 2, the first node may be, for example, a first endpoint node 14 and the second node may be, for example, a second endpoint node 17. For example, the first and second endpoint nodes 14 and 17 may have been endpoint nodes of a communication connection reported as having poor performance by a user. As discussed above, the selected first and second endpoint nodes 14 and 17 may be VoIP phones, i.e. identified by a phone number rather than an IP address. If the selected endpoints are VoIP phones, a CallManager server or a pair of CallManager servers that handles call processing may be identified and, for example, the internet protocol (IP) network addresses of the phones may be obtained from the CallManager. If a pair of CallManagers is used, one may be the primary CallManager and the other may be a backup CallManager. Gateway routers configured for the each of the VoIP phones may be identified by, for example, querying the VoIP phone and performance nodes (i.e. nodes configured to generate and/or collect network performance data based on active traffic simulation) in the same subnet as the VoIP phones may be identified by searching the subnet to facilitate testing of the path of a communications connection having a VoIP phone as an endpoint.

A CallManager according to some embodiments of the present invention may handle thousands of phones and may be located at, for example, a branch office or may be on a path of a communication connection. The CallManager may handle phone set up and may keep records in, for example, call detail records (CDRs) or call management records (CMRs), with respect to call activities. The records and/or activities may be associated with a particular phone using, for example, origination and destination information provided in the records. CallManagers may be located by sending, for example, dynamic host configuration protocol (DHCP) requests to the network. The DHCP protocol allows nodes of the path to request information from the servers. For example, when a VoIP phone is powered on it may be configured to automatically request, for example, its own IP address and a trivial file transfer protocol (TFTP) server from which the VoIP phone may retrieve additional configuration information including, for example, the IP address of its CallManager. Furthermore, the CallManager and/or IP address of the phone may be manually configured by the user.

A first portion of the test may determine a path of the communication connection between the first endpoint node 14 and the second endpoint node 17. The path of the communication connection between the first endpoint node 14 and the second endpoint node 17 may include one or more connecting nodes. As illustrated in FIG. 2, the connecting nodes may include, for example, a first router 31, a second router 33 and a switch 35. The path of the communication connection may be determined by, for example, running a traceroute between the first endpoint node 14 and the second endpoint node 17. The traceroute may be run in both directions as for a two-way communication connection, different paths may be used for each direction. In other words, the traceroute may be run from the first endpoint 14 to the second endpoint 17 and from the second endpoint 17 to the first endpoint 14.

It will be understood that the path illustrated in FIG. 2 is provided for exemplary purposes only and that embodiments of the present invention are not limited to this configuration. Paths of communication connections according to some embodiments of the present invention may include any combination of endpoints, routers, switches, voice gateways and the like without departing from the teachings of the present invention.

Network performance data associated with the determined path may be obtained based, for example, on active network traffic generated for purposes of making controlled network performance measurements and/or by polling at least one of the nodes on the path. Details of exemplary methods for obtaining network performance data using active traffic are discussed in commonly assigned U.S. patent application Ser. No. 09/951,050; filed on Sep. 11, 2001 and commonly assigned U.S. patent application Ser. No. 10/259,564; filed on Sep. 22, 2002 for VoIP or more generally in U.S. Pat. Nos. 5,937,165, 5,881,237, 5,838,919 and 6,397,359. While or after the active network performance data is obtained, the console node 20 may poll one or more of the nodes of the path for node specific information using, for example, SNMP polling. For example, the console node 20 may poll, i.e., send a query to, the first and/or second endpoints 14 and 17, first and second routers 31 and 33 and/or the switch 35 while the network performance data is being obtained during active traffic generation or shortly thereafter. The node specific data gained from polling one or more of the nodes of the path may include, but is not limited to, dropped or deferred packets, delay, central processing unit utilization, memory utilization and/or configuration data. Furthermore, if the first and/or second endpoints are VoIP phones, the console node 20 may also poll the CallManager to obtain, for example, previous call history and associated performance data, with respect to the VoIP phones maintained by the CallManager, such as jitter, delay and the like.

Figure 3:
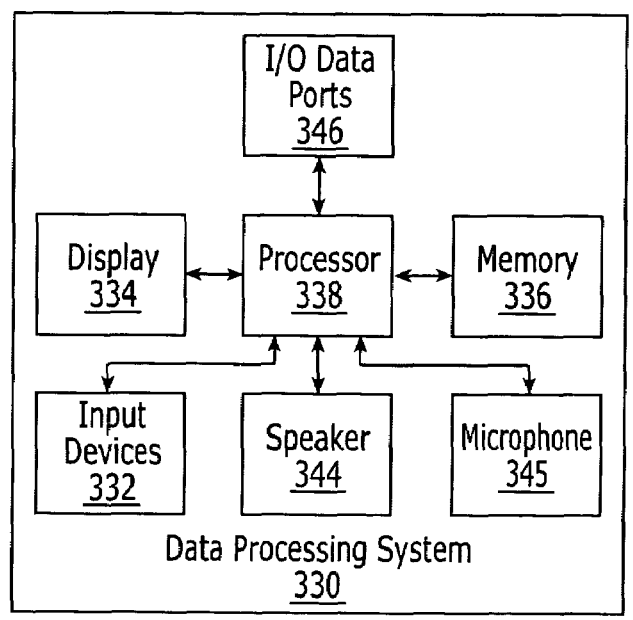
FIG. 3 is a block diagram of a data processing system according to some embodiments of the present invention.

Referring now to FIG. 3, a data processing system 330 according to some embodiments of the present invention will now be described. The data processing system 330 typically includes input device(s) 332, such as a keyboard or keypad, a display 334, and a memory 336 that communicate with a processor 338. The data processing system 330 may further include, for example, a speaker 344, a microphone 345 and I/O data port(s) 346 that also communicate with the processor 338. The I/O data ports 346 can be used to transfer information between the data processing system 330 and another computer system or a network 12, for example, using an IP connection. These components may be conventional components such as those used in many conventional data processing systems that may be configured to operate as described herein.

It will be understood that in some embodiments of the present invention, the data processing system may be operated using, for example, a graphical user interface (GUI). However, in further embodiments of the present invention, the data processing system according to embodiments of the present invention may be integrated with other data processing systems to provide enhanced functionality according to embodiments of the present invention.

Figure 4:
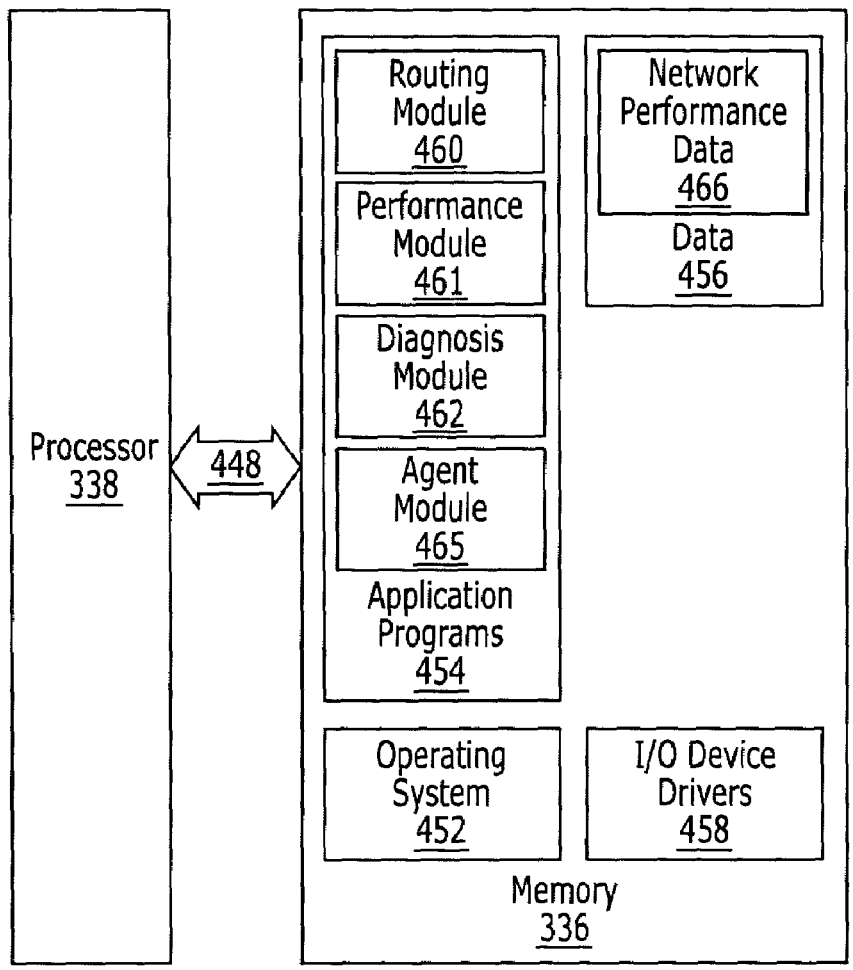
FIG. 4 is a more detailed block diagram of data processing systems implementing a control and/or an endpoint node according to some embodiments of the present invention.

Referring now to FIG. 4, a block diagram of data processing systems that illustrate methods, systems and computer program products for evaluating network performance according to some embodiments of the present invention will now be discussed. The processor 338 communicates with the memory 336 via an address/data bus 448. The processor 338 can be any commercially available or custom microprocessor. The memory 336 is representative of the overall hierarchy of memory devices containing the software and data used to implement the functionality of the data processing system 330. The memory 336 can include, but is not limited to, the following types of devices: cache, ROM, PROM, EPROM, EEPROM, flash memory, SRAM, and DRAM.

As shown in FIG. 4, the memory 336 may include several categories of software and data used in the data processing system 330: the operating system 452; the application programs 454; the input/output (I/O) device drivers 458; and the data 456. As will be appreciated by those of skill in the art, the operating system 452 may be any operating system suitable for use with a data processing system, such as Solaris from Sun Microsystems, OS/2, AIX or System 390 from International Business Machines Corporation, Armonk, N.Y., Windows 95, Windows 98, Windows NT, Windows ME, Windows XP or Windows 2000 from Microsoft Corporation, Redmond, Wash., Unix or Linux. The I/O device drivers 458 typically include software routines accessed through the operating system 452 by the application programs 454 to communicate with devices such as the input devices 332, the display 334, the speaker 344, the microphone 345, the I/O data port(s) 346, and certain memory 336 components. The application programs 454 are illustrative of the programs that implement the various features of the data processing system 330 and preferably include at least one application that supports operations according to some embodiments of the present invention. Finally, the data 456 represents the static and dynamic data used by the application programs 454, the operating system 452, the I/O device drivers 458, and other software programs that may reside in the memory 336.

Note that, while the present invention may be described herein generally with reference to packetized voice communication networks, for example, VoIP communications, the present invention is not so limited. Thus, it will be understood that the present invention may be used to evaluate networks supporting other types of data streams, for example, transmission control protocol (TCP) applications, web service applications, and/or any audio or video applications.

It will be understood that FIG. 4 illustrates a block diagram of data processing systems implementing a console and/or an endpoint node according to some embodiments of the present invention. Thus, the application programs 454 and the data 456 discussed with respect to FIG. 4 may be located in a console node, an endpoint node or both. The application programs 454 in a node may include, for example, a routing module 460 that transmits a request to determine a path of a communication connection between first and second selected nodes. The request may be transmitted through the I/O data ports 346, which provide a means for transmitting the request and also provide a receiver that receives, for example, over the network 12, network performance data 466 associated with the communication connection. It will be understood that the network performance data 466 according to some embodiments of the present invention may include end-to-end performance data as well as link and/or node specific performance data.

The routing module 460 may determine the path of a communication connection by, for example, running a traceroute between first and second selected endpoints of the communication connection, for example, first and second endpoint nodes 14 and 17 of FIG. 2. The first and second endpoint nodes may be selected by the user. In some embodiments of the present invention, the traceroute may be implemented by sending simulated VoIP traffic between the first and second endpoint nodes 14 and 17 in an RTP datagram.

A traceroute may be performed using a "time to live (TTL)" field in the RTP datagram. For example, a plurality of packets may be sent from a first endpoint node 14 having TTL fields set to values from, for example, 1 to N. Thus, for a first hop, for example, from the first endpoint node 14 to a first connecting node, the TTL field may be set to 1 hop. When the RTP datagram gets to the first connecting node, the first connecting node sends an error message back to the first endpoint node 14 indicating that the TTL field has expired. This error message may include information with respect to the first connecting node. For the second hop, for example, from the first endpoint node 14 to a second connecting node, the "time to live" field may be set to 2 hops. When the RTP datagram gets to the second connecting node, the second connecting node sends an error message back to the first endpoint node 14 indicating that the "time to live" has expired. This error message includes information with respect to the second connecting node. This RTP traceroute knows that the second endpoint node has been located if the first endpoint node 14 receives an error message from, for example, a destination, for example, the second endpoint node 17. At the end of the traceroute process, connecting nodes between the first endpoint node 14 and the second endpoint node 17 configured to process an RTP datagram may be identified. Furthermore, the RTP traceroute may be repeated a number of times. The information gained with respect to the nodes of the path may be used to calculate, for example, delay statistics for the nodes of the path based, for example, on the response times.

Simulating VoIP traffic, for example, a telephone call, on a data network generally involves call setup, i.e. the equivalent of getting a dialtone, dialing a phone number, getting a ring at the far end (or a busy signal), followed by the telephone conversation itself. The exchange of actual encoded voice data generally occurs after the call setup and before the call takedown using two data flows, one in each direction, to establish a bidirectional connection enabling both participants to speak at the same time. Each of these two data flows generally uses the Real-time Transport Protocol (RTP).

Figure 5:
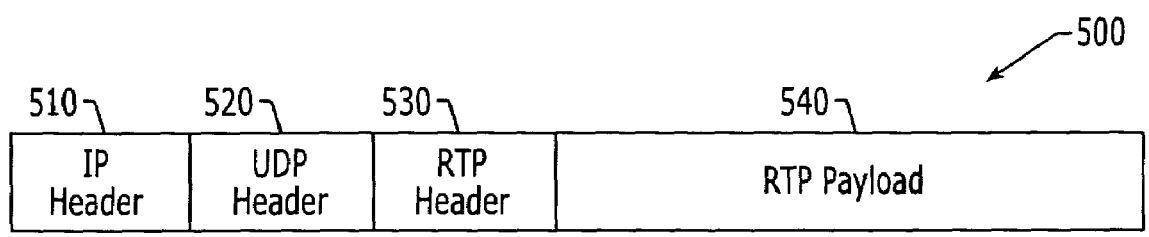
FIG. 5 is a block diagram illustrating an RTP datagram.

RTP is widely used for streaming audio and video. It is designed to send data in one direction without an acknowledgment. An exemplary RTP datagram is illustrated in FIG. 5. As illustrated, the RTP datagram 500 includes an internet protocol (IP) header 510, a user datagram protocol (UDP) header 520, an RTP header 530 and the RTP payload 540, i.e. the actual data. The RTP header 530 of an RTP datagram generally contains an RTP payload type, a sequence number, a timestamp and a source identification (ID) (not shown). Like UDP, RTP is a connectionless protocol. The RTP payload field of the RTP header 530 typically indicates what codec to use. Thus, users of embodiments of the present invention may select a particular codec to use during the test of network performance. The codec selection specifies the type of data, for example, voice, video, audio etc., and how it is encoded. The sequence number field of the RTP header 530 typically assists the receiver in reassembling data and detecting lost, out-of-order, and duplicate datagrams. The timestamp field of the RTP header 530 may be used to reconstruct the timing of the original audio or video. It also helps the receiver determine consistency of the variation of arrival times, discussed herein as jitter. Finally, the source ID field of the RTP header 530 assists the receiver in distinguishing multiple, simultaneous streams.

Embodiments of the present invention utilizing performance nodes discussed above generally determine the path of the communication connection between the selected endpoint by simulating VoIP traffic in a payload of an RTP datagram. Simulating actual VoIP network traffic has an advantage over simulating network traffic using other types of data packets because routers may treat packets differently depending on their payload. VoIP packets are typically given a higher preference, for example, they will not be discarded if a router is too busy, or they will be routed along a guaranteed path as opposed to one that uses best efforts. Accordingly, a traceroute using data packets other than VoIP packets may not accurately depict the path that VoIP traffic will take through the network.

Embodiments of the present invention that do not use performance nodes, i.e. nodes that do not support RTP traceroute operations may run a traceroute using SNMP queries. A cisco discovery protocol (CDP) is a protocol that may allow for discovery of nodes of the path, for example, switches. In particular, nodes of the path capable of supporting CDP, for example, Cisco devices, may use CDP to obtain data associated with other nodes of the path, for example, other Cisco devices. A console node 20 may obtain data associated with the nodes of the path using, for example, SNMP queries. Furthermore, an agent may be provided on ones of the nodes of the path. The agent may be configured to allow the node associated with the agent to send and receive queries to and from the other nodes of the path to obtain data associated with the other nodes of the path. The agent may be, for example, a service assurance agent (SAA) agent.

Accordingly, one of the selected endpoint nodes or the console node having an agent may send one or more SNMP queries to discover the nodes that make up the path, for example, routers, switches, voice gateways and the like. Once the nodes of the path have been discovered, an agent located on one or more of the nodes of the path may poll (i.e. send a query) the other nodes of the path to obtain network performance data associated with the other nodes of the path, for example, one-way delay, packet loss, jitter, jitter buffer loss and the like. The agent may use SNMP polling to poll the other nodes of the path. If the agent is an SAA agent, network performance data may be obtained using SNMP queries if at least two of the nodes of the path include an SAA. Embodiments of the present invention using agents, for example, SAAs, and SNMP polling to obtain network performance data may not be as accurate as those embodiments using active simulated network traffic in combination with performance nodes because embodiments of the present invention using SAA and SNMP polling may not obtain network performance data between the first endpoint and the first router and the last router and the last endpoint of the path, i.e. the first and last hops on the communication connection.

CDRs may include network performance data with respect to phone numbers dialed, length of calls to those phone numbers, and other network performance data. CDRs are generally kept in an SQL database by the CallManager. The network performance data may be obtained from the CDRs by SQL queries. These queries may provide, for example, jitter data, loss data, delay data and the like.

Furthermore, embodiments of the present invention that do not use performance nodes may also determine a path of a communication connection using, for example, the console node 20 to query a routing table including network performance data with respect to nodes of the path. The console node 20 may poll, for example, send queries to, the nodes of the path using, for example, SNMP polling.

As further illustrated in FIG. 4, the application programs 454 according to some embodiments of the present invention may further include a performance module 461 configured to obtain network performance data based on, for example, simulated network traffic on the determined communication connection. In particular embodiments of the present invention, the simulated network traffic may include RTP datagrams including VoIP data in the RTP payload 540 (FIG. 5) as discussed above. The details of some embodiments of performance modules 461 suitable for use in the present invention are discussed in commonly assigned U.S. patent application Ser. No. 09/951,050 entitled Methods, Systems and Computer Program Products for Packetized Voice Network Evaluation filed on Sep. 11, 2001.

As further illustrated in FIG. 4, the application programs 454 in a node may also include a diagnosis module 462. The diagnosis module 462 may be configured to evaluate a plurality of diagnostic rules based on the obtained network performance data 466. The diagnostic rules are rules that identify additional network performance data to be collected based on previously obtained network performance data or generate a diagnosis based on previously obtained network performance data. The diagnostic rules may, for example, consist of conditions that test for the presence or absence of network performance data and actions to perform if the condition(s) are satisfied. Adding or deleting conditions from a rule can control the order in which the rules are used. For example one of the plurality of diagnostic rules may be: "If a traceroute has not already been run between a first endpoint and a second endpoint, then run a traceroute between the first and second endpoints." The network performance data collection actions triggered by each satisfied rule may result in the collection of more network performance data that may trigger the action of another one of the plurality of diagnostic rules. It will be understood that the network performance data collection action triggered by a satisfied rule may be that no further network performance data needs to be obtained as a network performance diagnosis may be made based on the already available network performance data. The console node 20 or one or more of the nodes 14, 15, 16, 17, 18 may generate this diagnosis.

Thus, the diagnosis module 462 in various embodiments of the present invention is configured to iteratively evaluate ones of the plurality of diagnostic rules based on the additional network performance data to identify even more network performance data to be collected or to generate a network performance diagnosis based on the additional network performance data. An individual diagnostic rule may initiate an action to collect more network performance data multiple times or no times for a particular diagnosis depending on the rule and the network performance data collected. The diagnosis module 462 may be further configured to continue to iteratively evaluate the network performance data and identify additional network performance data to be collected a number of times specified by ones of the plurality of diagnostic rules and to generate a diagnosis based on the collected network performance data.

As is also illustrated in FIG. 4, the application programs 454 in a node device may further include an agent module 465. The agent module 454 may be included on an endpoint node or one or more of the connecting nodes of the path, for example, routers 31 and 33 of FIG. 2. As discussed above, an agent module 456 located on one of the nodes of the path is configured to send and receive queries to and from other nodes of the path to obtain node specific network performance data. The agent module may be, for example, an SAA as discussed above with respect to the routing module 460. It will be understood that the performance node is distinct from an agent module but may also have the capability to send and receive queries to and from other nodes of the path to obtain network performance data. A performance node may or may not include an agent module 454 without departing from the teachings of the present invention. It will be further understood that some nodes may not be performance nodes or include agent modules 456. These nodes may be configured to receive queries and respond to them, but may not have the capability of sending queries to obtain network performance data.

While the present invention is illustrated, for example, with reference to the routing module 460, the performance module 461, the diagnosis module 462 and the agent module 465 being application programs in FIG. 4, as will be appreciated by those of skill in the art, other configurations may also be used while still benefiting from the teachings of the present invention. For example, the routing module 460, the performance module 461, the diagnosis module 462 and the agent module 465 may also be incorporated into the operating system 452 or other such logical division of the data processing system 330. Thus, the present invention should not be construed as limited to the configuration of FIG. 4 but is intended to encompass any configuration capable of carrying out the operations described herein.

Figure 6:
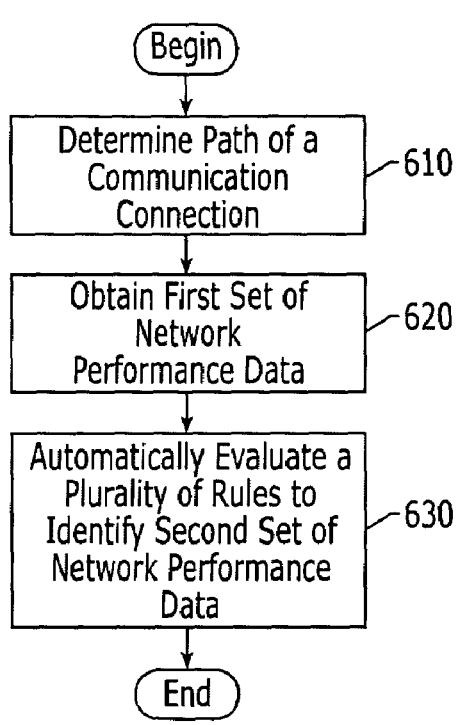
FIG. 6 is a flow chart illustrating operations for evaluating network performance according to some embodiments of the present invention.

Referring now to the flowchart diagram of FIG. 6, operations for evaluating network performance will be further described for some embodiments of the present invention. Operations begin at block 610 by determining a path of a communication connection between a first node and a second node. The first and second nodes may be selected by a user. The first and second nodes may be, for example, first and second endpoint nodes or first and second VoIP phones as discussed above. The path may include a plurality of connecting nodes, for example, routers, switches and/or voice gateways. As discussed above, the path may be determined using simulated network traffic, for example, RTP datagrams including VoIP data. In these embodiments, the first and second nodes may be first and second performance nodes. As discussed above, a performance node may allow simulated network traffic to be sent between the first and second endpoint nodes. If performance nodes are installed and the first and second endpoints are VoIP phones, first and second performance nodes may be selected in the same subnet as the VoIP phones to facilitate a traceroute using simulated network traffic.

In certain embodiments of the present invention performance nodes may not be installed. In these embodiments the path may be determined, for example, using SNMP queries in combination with agents, for example, SAAs, located on ones of the nodes of the path as discussed above. An agent allows for network performance monitoring between nodes of the path, for example, a router and a remote device such as another router. Furthermore, if performance nodes have not been installed and the first and second endpoints are VoIP phones, the CallManagers associated with each of the phones may be queried by, for example, the agents to obtain performance data with respect to the VoIP phones.

In certain embodiments of the present invention, an internet control message protocol (ICMP) traceroute may be run to determine the path of the communication connection. Accordingly, nodes of the path of the communication connection having ICMP capabilities enabled are used for such embodiments.

A first set of network performance data associated with the communication connection may be obtained (block 620). This network performance data may be obtained by running a network performance test. As used herein a "performance test" refers to a test where active traffic is simulated on the path of the communication connection and network performance data is obtained based on the simulated traffic. The obtained network performance data may be used to calculate further network performance data, such as end-to-end performance characteristics such as jitter, jitter buffer loss, delay, loss and/or mean opinion score (MOS). The network performance data may also include symmetry information with respect to the path from the first endpoint to the second endpoint and from the second endpoint to the first endpoint. Network performance data may also include delay across ones of the nodes of the path, number of dropped packets for ones of the nodes of the path, and CPU utilization and memory utilization for ones of the nodes of the path. Network performance data may further include configuration data associated with the nodes of the path. Network performance tests utilizing active traffic are discussed, for example, in commonly assigned U.S. patent application Ser. No. 09/951,050, filed on Sep. 11, 2001 and commonly assigned U.S. patent application Ser. No. 10/259,564, filed on Sep. 22, 2002 for VoIP or more generally in commonly assigned U.S. Pat. Nos. 5,937,165, 5,881,237, 5,838,919 and 6,397,359.

A plurality of diagnostic rules are automatically evaluated based on the obtained first set of network performance data to identify a second set of network performance data to be collected (block 630). As discussed above, the rules consist of condition(s) that may cause an action or produce a diagnosis if the condition(s) are satisfied. For example, if a path has been determined and an obtained end-to-end does not satisfy a performance criteria, then the ones of the node interfaces are polled for network performance data maintained thereon. The polling of the node interfaces may trigger the application of other ones of the plurality of diagnostic rules and/or the collection of additional network performance data.

Ones of the plurality of rules set out below may be dependent on satisfying certain performance and/or configuration criteria. Performance criteria as used herein refers to data that may indicate network performance, for example, delays exceeding a predetermined threshold, jitter, jitter buffer loss, loss, delay of a particular node of the path, MOS and the like. Tables 1 and 2 illustrate various performance criteria and the related thresholds that may be used in some embodiments of the present invention. Tables 1 and 2 may be used to determine if a problem exists and the overall network quality according to some embodiments of the present invention.

For example, if delay is measured to be 100 ms, the quality of the delay may be characterized as good because 100 is "no more than" 150, thus, there may be no problems with the delay. If, on the other hand, delay is measured as 175 ms, the delay may be characterized as marginal because 175 is more than 150 and less then or equal to 400, however, a delay problem may be diagnosed. Finally, if the delay is measured as 401 ms, the delay may be characterized as poor because 401 is more than 400 and a delay problem will be diagnosed. With respect to Table 2, a mean opinion score (MOS) value may be treated differently because, unlike the performance criteria of Table 1, a lower MOS value is worse than a higher MOS value.

TABLE 1

|  | Good No more than: | Marginal No more than: |
|---|---|---|
| Delay (ms): | 150 | 400 |
| Jitter Buffer Loss (%): | 0.500 | 1.000 |
| Lost Data (%): | 0.500 | 1.000 |
| WAN interface bandwidth utilization (%): | 30 | 50 |
| LAN interface bandwidth utilization (%): | 30 | 75 |
| Device CPU utilization (%): | 50 | 75 |
| Insufficient bandwidth (kbps): | 30 | 50 |

TABLE 2

|  | Good At least: | Marginal At least: |
|---|---|---|
| Call quality (MOS) | 4.03 | 3.60 |

It will be understood that the values associated with the performance criteria provided in Tables 1 and 2 above are provided for exemplary purposes only and embodiments of the present invention are not limited to these values. For example, a user may configure the values of the performance criteria to tailor the product to the user's network.

Furthermore, configuration criteria as used herein may refer to data that may indicate that certain nodes of the path are not configured correctly such that the configuration of the nodes of the path affect the quality, for example, voice quality, of the network. For example, configuration criteria according to embodiments of the present invention may include, but is not limited to, link fragmentation and interleaving (LFI) may not be configured for at least one of the nodes of the path, an interface of at least one of the nodes of the path may not be configured to receive RTP datagrams, and/or a mismatch of a header-compression field configuration between at least two interfaces of the nodes of the path.

Ones of the plurality of diagnostic rules identifying further network performance data to be collected may include if the path of a communication connection between the first node and the second node has been determined and end-to-end delay network performance data fails to meet a performance criteria, then poll ones of the nodes to obtain network performance data associated with the ones of the nodes. For example, if end-to-end delay exceeds 400 ms, then poll ones of the nodes to obtain network performance data associated with ones of the nodes. Ones of the plurality of diagnostic rules identifying further network performance data to be collected may further include if at least one of the nodes of the path is located in a WAN, then poll the at least one of the nodes of the path for network performance data associated with the at least one of the nodes of the path. According to some embodiments of the present invention, VoIP problems may occur more often in slower networks, for example, WANs, thus, the nodes of the path located in WANs may be polled to obtain network performance data associate therewith. Ones of the plurality of diagnostic rules may further include if at least one valid node exists on the path of the communication connection, then obtain network performance data associated with the at least one valid node of the path. For example, if a valid address has been obtained for at least one of the nodes of the path, obtain network performance data associated with the node having the valid address.

Ones of the plurality of diagnostic rules that generates a performance diagnosis when none of the plurality of rules identifying further network performance data to be collected is satisfied may include if a path has been determined and the end-to-end delay fails to meet a performance criteria, then diagnose an end-to-end delay problem. For example, if the end-to-end delay exceeds 400 ms, then an end-to-end delay problem is diagnosed. Ones of the plurality of diagnostic rules may further include if obtained network performance data fails to satisfy an end-to-end jitter buffer loss, then diagnose a problem with end-to-end jitter buffer loss. For example, if the end-to-end jitter buffer loss exceeds 1.0 percent, the end-to-end jitter buffer loss problem is diagnosed. Similar rules may apply to associated performance criteria, for example, an end-to-end delay, an end-to-end jitter, an end-to-end loss and/or end-to-end MOS using the performance criteria set out above in Tables 1 and 2. The plurality of diagnostic rules may further include if the network performance data associated with the at least one valid node of the path has been obtained and configuration network performance data associated with the at least one valid node of the path fails to satisfy a configuration criteria, then diagnose bad configuration settings associated with the at least one valid node of the path that fails to satisfy a configuration criteria. For example, if an "rtp priority" and/or "rtp preserve" configuration setting is not present in a configuration of a node of the path, then the node of the path is diagnosed as not being configured for RTP traffic. If "fragment delay" and "multilink" configuration settings are not present in a configuration of a node of the path, then the node of the path is diagnosed as not being configured for LFI. Finally, when comparing the configuration settings of two or more nodes of the path, for example, two serial nodes, the "header compression" fields of the two or more nodes of the path do not match, then the nodes having mismatched "header compression" fields are diagnosed as having mismatched header compression.

The plurality of diagnostic rules may further include if the polling of ones of the nodes of the path has been completed and network performance data associated with the ones of nodes of the path fails to satisfy an associated performance criteria, then diagnose loss rate network performance data associated with ones of the plurality of nodes as failing to satisfy the associated performance criteria. For example, if the lost data rate exceeds 1.0 percent, diagnose a lost data problem. The plurality of diagnostic rules may further include if the polling of ones of the nodes of the path has been completed and network performance data associated with the ones of nodes of the path fails to satisfy an associated performance criteria, then diagnose bandwidth network performance data associated with ones of the plurality of nodes as failing to satisfy the associated performance criteria. For example, if the plurality of nodes of the path are located on a WAN network and the bandwidth exceeds 30%, a bandwidth problem is diagnosed. The plurality of diagnostic rules may further include if the polling of ones of the nodes of the path has been completed and network performance data associated with the ones of nodes of the path fails to satisfy an associated performance criteria, then diagnose queue length network performance data associated with ones of the plurality of nodes as failing to satisfy the associated performance criteria. For example, if queue length is greater than 0, a problem related to queue length may be diagnosed.

Figure 7:
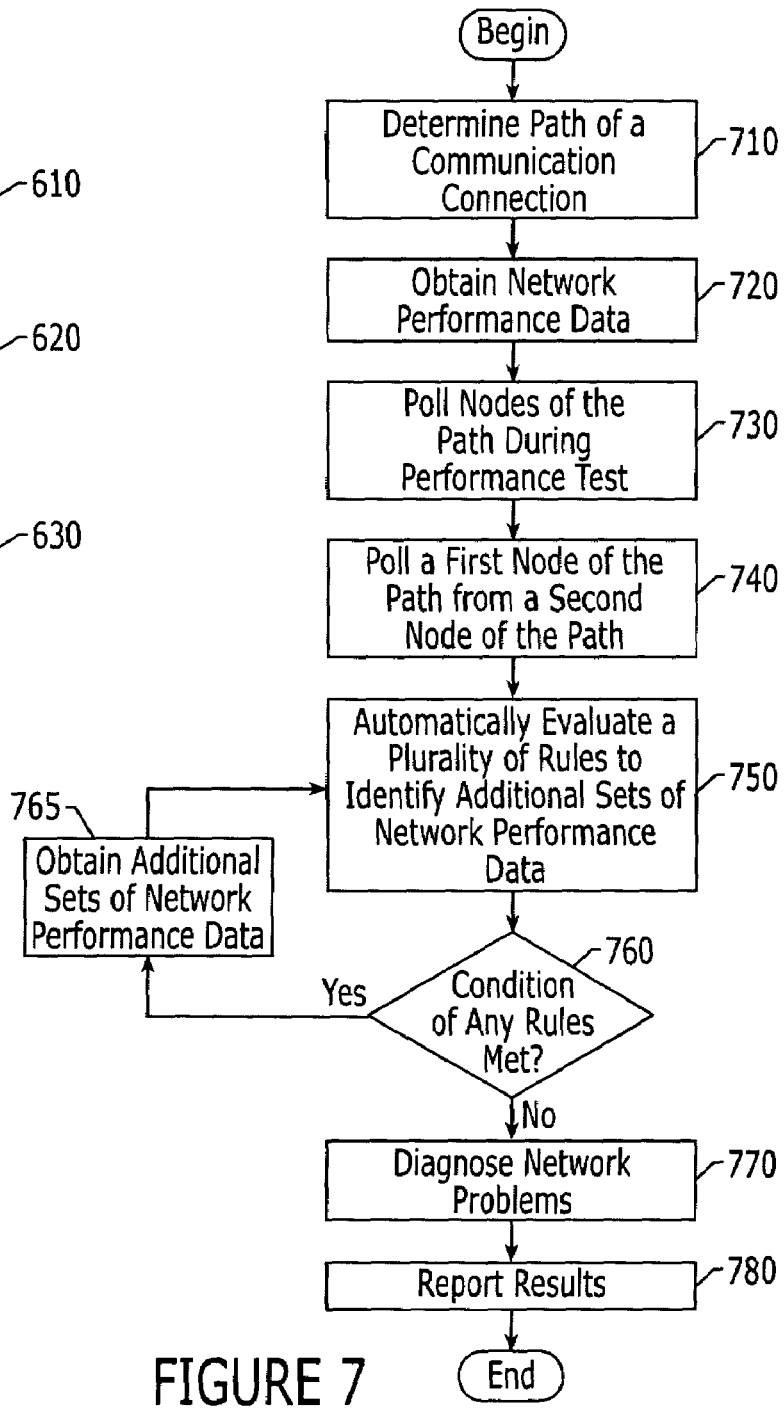
FIG. 7 is a flow chart illustrating operations for evaluating network performance according to some embodiments of the present invention.

Referring now to the flowchart diagram of FIG. 7, operations for evaluating network performance will be further described for various further embodiments of the present invention. Operations begin at block 710 by determining a path of a communication connection between a first node and a second node. The path may include a series of connecting nodes of the path, for example, routers, switches and voice gateways. In certain embodiments, the path may be determined if a valid address, for example, IP address, hostname and the like, for the first node and second node are known. If the valid addresses for the first node and second node are not known, an invalid address error may be generated.

A first set of network performance data may be obtained by, for example, running a performance test between the first node and the second node (block 720). As discussed above, a performance test refers to a test where active traffic is simulated on the path of the communication connection and network performance data is obtained based on the simulated traffic. The obtained network performance data may be used to calculate further network performance data. In certain embodiments of the present invention, the first set of performance data may not be obtained if the path of the communication connection has not been determined.

One or more of the nodes of the path, for example, the first and second nodes selected by the user and the connecting nodes of the path, may be polled during or shortly after the performance test to obtain node specific data (block 730). The nodes of the path may be polled during, for example, one minute of the performance test, i.e. while active traffic is being generated. The console node, for example, console node 20 of FIGS. 1 and 2, may poll the nodes of the path using SNMP polling. Network performance data obtained from polling (sending a query) to the nodes of the path may include ingress and egress interface media for ones of the nodes of the path, for example, Ethernet, frame relay, asynchronous transfer mode and the like. Network performance data obtained from polling the nodes of the path may further include the speed of ones of the nodes, the length of operation of ones of the nodes, configuration data with respect to ones of the nodes and other historical data related to ones of the nodes of the path.

Furthermore, ones of the nodes of the path may send queries to others of the nodes of the path to obtain network performance data associated with ones of the nodes of the path using, for example, agents located on the nodes (block 740). These agents may be, for example, SAA agents and may use SNMP polling. As discussed above, some of the nodes of path may not include an agent and may be configured to receive and respond to queries, but not to send queries to other nodes of the path. Ones of the plurality of diagnostic rules are automatically evaluated based on the first set of obtained network performance data to identify a second set of network performance data to be collected (block 750).

If it is determined that an additional set of network performance data need not be identified based on ones of the plurality of diagnostic rules, i.e. none of the plurality of diagnostic rules identifying further network performance data to be collected is satisfied (block 760), operations continue to block 770 and a network performance diagnosis is rendered. If, on the other hand, it is determined that one or more of the conditions of at least one of the plurality of diagnostic rules is satisfied, i.e. at least one of the plurality of rules identifying further network performance data to be collected is satisfied (block 760), an additional set of network performance data is obtained (block 765) and operations return to block 750 and repeat until it is determined that none of the plurality of diagnostic rules that have an action of getting more network performance data are satisfied (block 760). The results may be reported to the user, for example, on a graphical user interface (GUI) depicting the path and each of the nodes of the path and the obtained network performance data associated therewith (block 780).

As described above with respect to FIGS. 1 through 7, embodiments of the present invention provide methods, systems and computer program products for evaluating network performance using ones of a plurality of diagnostic rules. Network performance data may be obtained by generating simulated network traffic on a known path and/or polling the devices on the path. Ones of the plurality of diagnostic rules may be automatically evaluated based on the obtained network performance data to identify a next set of network performance data to be collected. Network performance data may be collected to a point specified by the rules. The collected network performance data may be used to generate a network performance diagnosis. Diagnoses according to some embodiments of the present invention may allow for more specific troubleshooting.

It will be understood that the block diagram illustrations of FIGS. 1 through 5 and combinations of blocks in the block diagrams may be implemented using discrete and integrated electronic circuits. It will also be appreciated that blocks of the block diagram of FIGS. 1 through 5 and combinations of blocks in the block diagrams may be implemented using components other than those illustrated in FIGS. 1 through 5, and that, in general, various blocks of the block diagrams and combinations of blocks in the block diagrams, may be implemented in special purpose hardware such as discrete analog and/or digital circuitry, combinations of integrated circuits or one or more application specific integrated circuits (ASICs).

Accordingly, blocks of the block diagrams of FIGS. 1 through 5 and the flowcharts of FIGS. 6 and 7 support electronic circuits and other means for performing the specified operations, as well as combinations of operations. It will be understood that the circuits and other means supported by each block and combinations of blocks can be implemented by special purpose hardware, software or firmware operating on special or general purpose data processors, or combinations thereof. It should also be noted that, in some alternative implementations, the operations noted in the flowcharts of FIGS. 6 and 7 may occur out of the order noted in the figures.

For example, two blocks shown in succession may, in fact, be executed substantially concurrently, or the blocks may sometimes be executed in the reverse order.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. A method for evaluating network performance, the method comprising:
    determining a path of a communication connection between a first node and a second node, the path including at least one connecting node;
    obtaining a first set of network performance data associated with the communication connection, wherein obtaining a first set of network performance data comprises obtaining the first set of network performance data based on generated network traffic; and
    automatically evaluating ones of a plurality of diagnostic rules based on the obtained first set of network performance data to identify a second set of network performance data to be collected, wherein the ones of the plurality of diagnostic rules include polling nodes to obtain network performance data, obtaining network performance data and/or diagnosing a problem based on network performance data.

2. The method of claim 1 further comprising:
    obtaining the second set of network performance data; and
    evaluating ones of the plurality of diagnostic rules based on the second set of network performance data to identify a third set of network performance data to be collected.

3. The method of claim 2 further comprising repeating the evaluating and the identifying operations until none of the plurality of rules identifying further network performance data to be collected is satisfied.

4. The method of claim 3 wherein at least one of the plurality of diagnostic rules generates a network performance diagnosis when none of the plurality of rules identifying further network performance data to be collected is satisfied.

5. The method of claim 1 further comprising generating the network traffic between the first node and the second node.

6. The method of claim 5 wherein obtaining network performance data further comprises polling at least one of the nodes of the path configured to receive queries while network traffic is being generated to obtain network performance data from the at least one of the nodes of the path.

7. The method of claim 1 wherein determining a path of a communication connection comprises:
    running a traceroute from the first node and the second node; and
    running a traceroute from the second node to the first node.

8. The method of claim 1 wherein determining a path of a communication connection comprises generating network traffic between the first node and the second node using a real-time transport protocol (RTP) datagram.

9. The method of claim 8 wherein the RTP datagram includes voice over internet protocol (VoIP) data.

10. The method of claim 1 wherein determining a path of a communication connection comprises determining the path utilizing an agent located on at least one of the nodes of the path and a simple network management protocol (SNMP).

11. The method of claim 1 wherein the connecting nodes of the path are selected from the group consisting of a router, a switch and a voice gateway.

12. The method of claim 11 wherein an agent located on a first one of the nodes of the path sends a query to a second one of the nodes of the path configured to receive queries to obtain network performance data associated with the second node of the path.

13. The method of claim 12 wherein the agent located on the first one of the nodes of the path sends a query to the second one of the nodes of the path using SNMP polling.

14. The method of claim 1 further comprising:
    generating active traffic between the first and second nodes; and
    calculating the first set of network performance data based on the generated traffic between the first and second nodes.

15. The method of claim 14 wherein the calculated first set of network performance data comprises at least one of an end-to-end delay, an end-to-end jitter, an end-to-end jitter buffer loss, an end-to-end loss, an end-to-end mean opinion score, a delay across ones of the nodes of the path, a number of dropped packets for ones of the nodes of the path, a central processing unit utilization for ones of the nodes of the path and/or a memory utilization for ones of the nodes of the path.

16. The method of claim 1 wherein determining a path comprises determining a path of a communication connection if a valid address for the first node and second node are known, the method further comprising diagnosing an invalid address if it is determined that a valid address for the first node and second node are not known.

17. The method of claim 1 wherein obtaining a first set of network performance data comprises obtaining a first set of network performance data if the path of the communication connection has been determined between the first node and the second node.

18. The method of claim 1 wherein ones of the plurality of diagnostic rules identifying further network performance data to be collected are selected from the group consisting of:
    if the path of a communication connection between the first node and the second node has been determined and end-to-end delay network performance data fails to meet a performance criteria, then poll ones of the nodes to obtain network performance data associated with the ones of the nodes;
    if at least one of the nodes of the path is located in a WAN, then poll the at least one of the nodes of the path for network performance data associated with the at least one of the nodes of the path; and
    if at least one valid node exists on the path of the communication connection, then obtain network performance data associated with the at least one valid node of the path.

19. The method of claim 18 wherein at least one of the plurality of rules that generates a performance diagnosis when none of the plurality of rules identifying further network performance data to be collected is satisfied are selected from the group consisting of:

if a path has been determined and the end-to-end delay does not satisfy a performance criteria, then diagnose an end-to-end delay problem;

if obtained network performance data fails to satisfy a performance criteria associated with end-to-end jitter buffer loss, then diagnose an end-to-end jitter buffer loss problem;

if obtained network performance data fails to satisfy a performance criteria associated with end-to-end MOS, then diagnose an end-to-end MOS problem;

if obtained network performance data fails to satisfy a performance criteria associated with end-to-end jitter, then diagnose an end-to-end jitter problem;

if obtained network performance data fails to satisfy a performance criteria associated with end-to-end loss, then diagnose an end-to-end loss problem;

if the network performance data associated with the at least one valid node of the path has been obtained and the network performance data associated with the at least one valid node of the path fails to satisfy a configuration criteria, then diagnose bad configuration settings associated with the at least one valid node of the path that fails to satisfy a configuration criteria;

if the polling of ones of the nodes of the path has been completed and network performance data associated with the ones of nodes of the path fails to satisfy an associated performance criteria, then diagnose loss rate network performance data associated with ones of the plurality of nodes as failing to satisfy the associated performance criteria;

if the polling of ones of the nodes of the path has been completed and network performance data associated with the ones of nodes of the path fails to satisfy an associated performance criteria, then diagnose bandwidth network performance data associated with ones of the plurality of nodes as failing to satisfy the associated performance criteria; and if the polling of ones of the nodes of the path has been completed and network performance data associated with the ones of nodes of the path fails to satisfy an associated performance criteria, then diagnose queue length network performance data associated with ones of the plurality of nodes as failing to satisfy the associated performance criteria.

20. The method of claim 1, wherein the diagnostic rules comprise at least one condition that identifies additional sets of network performance data to be collected based on previously obtained sets of network performance data and/or triggers generation of a diagnosis based on previously obtained sets of network performance data.

21. The method of claim 1, wherein the diagnostic rules comprise at least one condition that test for presence or absence of network performance data and actions to perform if the at least one condition is satisfied.

22. A system for evaluating network performance including modules stored on a computer readable storage medium, the system comprising:

a routing module that is configured to determine a path of a communication connection between a first node and a second node, the path including at least one connecting node;

a performance module that is configured to obtain a first set of network performance data associated with the communication connection based on the generated network traffic; and a diagnosis module that is configured to automatically evaluate ones of a plurality of diagnostic rules based on the obtained first set of network performance data to identify a second set of network performance data to be collected, wherein the ones of the plurality of diagnostic rules include polling nodes to obtain network performance data, obtaining network performance data and/or diagnosing a problem based on network performance data.

23. The system of claim 22 wherein the diagnosis module is further configured to:

obtain the second set of network performance data; and evaluate ones of the plurality of diagnostic rules based on the second set of network performance data to identify a third set of network performance data to be collected.

24. The system of claim 23 wherein the diagnosis module is further configured to repeatedly evaluate and identify until none of the plurality of rules identifying further network performance data to be collected is satisfied.

25. The system of claim 24 wherein at least one of the plurality of diagnostic rules generates a network performance diagnosis when none of the plurality of rules identifying further network performance data to be collected is satisfied.

26. The system of claim 22 wherein the performance module is further configured to generate network traffic between the first node and the second node.

27. The system of claim 26 wherein the performance module is further configured to poll at least one of the nodes of the path configured to receive queries while network traffic is being generated to obtain network performance data from the at least one of the nodes of the path.

28. The system of claim 22 wherein the routing module is further configured to:

run a traceroute from the first node and the second node; and run a traceroute from the second node to the first node.

29. The system of claim 22 wherein the routing module if further configured to generate network traffic between the first node and the second node using a real-time transport protocol (RTP) datagram to obtain the path of the communication connection.

30. The system of claim 29 wherein the RTP datagram includes voice over internet protocol (VoIP) data.

31. The system of claim 22 wherein the routing module if further configured to determine the path utilizing an agent located on at least one of the nodes of the path and a simple network management protocol (SNMP).

32. The system of claim 22 further comprising an agent module located on a first one of the nodes of the path that is configured to send a query to a second one of the nodes of the path configured to receive queries to obtain network performance data associated with the second node of the path.

33. The system of claim 32 wherein the agent module located on the first one of the nodes of the path is further configured to send a query to the second one of the nodes of the path using SNMP polling.

34. The system of claim 22 wherein ones of the plurality of diagnostic rules identifying further network performance data to be collected are selected from the group consisting of:

if the path of a communication connection between the first node and the second node has been determined and end-to-end delay network performance data fails to meet a performance criteria, then poll ones of the nodes to obtain network performance data associated with the ones of the nodes;

if at least one of the nodes of the path is located in a WAN, then poll the at least one of the nodes of the path for network performance data associated with the at least one of the nodes of the path; and if at least one valid node exists on the path of the communication connection, then obtain network performance data associated with the at least one valid node of the path.

35. The system of claim 34 wherein at least one of the plurality of rules that generates a performance diagnosis when none of the plurality of rules identifying further network performance data to be collected is satisfied are selected from the group consisting of:

if a path has been determined and the end-to-end delay does not satisfy a performance criteria, then diagnose an end-to-end delay problem;

if obtained network performance data fails to satisfy a performance criteria associated with end-to-end jitter buffer loss, then diagnose an end-to-end jitter buffer loss problem;

if obtained network performance data fails to satisfy a performance criteria associated with MOS, then diagnose a MOS problem;

if obtained network performance data fails to satisfy a performance criteria associated with end-to-end jitter, then diagnose an end-to-end jitter problem;

if obtained network performance data fails to satisfy a performance criteria associated with end-to-end loss, then diagnose an end-to-end loss problem;

if the network performance data associated with the at least one valid node of the path has been obtained and the network performance data associated with the at least one valid node of the path fails to satisfy a configuration criteria, then diagnose bad configuration settings associated with the at least one valid node of the path that fails to satisfy a configuration criteria;

if the polling of ones of the nodes of the path has been completed and network performance data associated with the ones of nodes of the path fails to satisfy an associated performance criteria, then diagnose loss rate network performance data associated with ones of the plurality of nodes as failing to satisfy the associated performance criteria;

if the polling of ones of the nodes of the path has been completed and network performance data associated with the ones of nodes of the path fails to satisfy an associated performance criteria, then diagnose bandwidth network performance data associated with ones of the plurality of nodes as failing to satisfy the associated performance criteria; and if the polling of ones of the nodes of the path has been completed and network performance data associated with the ones of nodes of the path fails to satisfy an associated performance criteria, then diagnose queue length network performance data associated with ones of the plurality of nodes as failing to satisfy the associated performance criteria.

36. A system for evaluating network performance, the system comprising:

means for determining a path of a communication connection between a first node and a second node, the path including at least one connecting node;

means for obtaining a first set of network performance data associated with the communication connection, wherein the means for obtaining a first set of network performance data comprises means for obtaining the first set of network performance data based on generated network traffic; and means for automatically evaluating ones of a plurality of diagnostic rules based on the obtained first set of network performance data to identify a second set of network performance data to be collected, wherein the ones of the plurality of diagnostic rules include means for polling nodes to obtain network performance data, means for obtaining network performance data and/or means for diagnosing a problem based on network performance data.

37. The system of claim 36 wherein the means for determining a path of a communication connection comprises means for generating network traffic between the first node and the second node using a real-time transport protocol (RTP) datagram.

38. The system of claim 37 wherein the RTP datagram includes voice over internet protocol (VoIP) data.

39. A computer program product stored on a computer-readable storage medium for evaluating net work performance, the computer program product comprising:

computer-readable program code that determines a path of a communication connection between a first node and a second node, the path including at least one connecting node;

computer readable program code that obtains a first set of network performance data associated with the communication connection, wherein the computer readable program code configured to obtain a first set of network performance data comprises computer readable program code configured to obtain the first set of network performance data based on generated network traffic; and computer readable program code that automatically evaluates ones of a plurality of diagnostic rules based on the obtained first set of network performance data to identify a second set of network performance data to be collected, wherein the ones of the plurality of diagnostic rules include computer readable program code configure to poll nodes to obtain network performance data, computer readable program code configured to obtain network performance data and/or computer readable program code configured to diagnose a problem based on network performance data.

40. The computer program product of claim 39 further comprising:

computer readable program code that obtains the second set of network performance data; and computer readable program code that evaluates ones of the plurality of diagnostic rules based on the second set of network performance data to identify a third set of network performance data to be collected.

41. The computer program product of claim 40 further comprising computer readable program code that repeatedly evaluates and the identifies until none of the plurality of rules identifying further network performance data to be collected is satisfied.

42. The computer program product of claim 39 wherein at least one of the plurality of diagnostic rules generates a network performance diagnosis when none of the plurality of rules identifying further network performance data to be collected is satisfied.

43. The computer program product of claim 39 further comprising computer readable program code that generates network traffic between the first node and the second node.

44. The computer program product of claim 39 wherein the computer readable program code that determines a path of a communication connection comprises computer readable program code that generates network traffic between the first node and the second node using a real-time transport protocol (RTP) datagram.

45. The computer program product of claim 44 wherein the RTP datagram includes voice over internet protocol (VoIP) data.

46. The computer program product of claim 39 wherein ones of the plurality of diagnostic rules identifying further network performance data to be collected are selected from the group consisting of:

if the path of a communication connection between the first node and the second node has been determined and end-to-end delay network performance data fails to meet a performance criteria, then poll ones of the nodes to obtain network performance data associated with the ones of the nodes;

if at least one of the nodes of the path is located in a WAN, then poll the at least one of the nodes of the path for network performance data associated with the at least one of the nodes of the path; and if at least one valid node exists on the path of the communication connection, then obtain network performance data associated with the at least one valid node of the path.

47. The computer program product of claim 46 wherein at least one of the plurality of rules that generates a performance diagnosis when none of the plurality of rules identifying further network performance data to be collected is satisfied are selected from the group consisting of:

if a path has been determined and the end-to-end delay does not satisfy a performance criteria, then diagnose an end-to-end delay problem;

if obtained network performance data fails to satisfy a performance criteria associated with end-to-end jitter buffer loss, then diagnose an end-to-end jitter buffer loss problem;

if obtained network performance data fails to satisfy a performance criteria associated with end-to-end MOS, then diagnose an end-to-end MOS problem;

if obtained network performance data fails to satisfy a performance criteria associated with end-to-end jitter, then diagnose an end-to-end jitter problem;

if obtained network performance data fails to satisfy a performance criteria associated with end-to-end loss, then diagnose an end-to-end loss problem;

if the network performance data associated with the at least one valid node of the path has been obtained and the network performance data associated with the at least one valid node of the path fails to satisfy a configuration criteria, then diagnose bad configuration settings associated with the at least one valid node of the path that fails to satisfy a configuration criteria;

if the polling of ones of the nodes of the path has been completed and network performance data associated with the ones of nodes of the path fails to satisfy an associated performance criteria, then diagnose loss rate network performance data associated with ones of the plurality of nodes as failing to satisfy the associated performance criteria;

if the polling of ones of the nodes of the path has been completed and network performance data associated with the ones of nodes of the path fails to satisfy an associated performance criteria, then diagnose bandwidth network performance data associated with ones of the plurality of nodes as failing to satisfy the associated performance criteria; and if the polling of ones of the nodes of the path has been completed and network performance data associated with the ones of nodes of the path fails to satisfy an associated performance criteria, then diagnose queue length network performance data associated with ones of the plurality of nodes as failing to satisfy the associated performance criteria.

* * * * *

UNITED STATES PATENT AND TRADEMARK OFFICE
CERTIFICATE OF CORRECTION

PATENT NO. : 7,680,920 B2
APPLICATION NO. : 10/395347
DATED : March 16, 2010
INVENTOR(S) : Selvaggi et al.

It is certified that error appears in the above-identified patent and that said Letters Patent is hereby corrected as shown below:

Column 24, Claim 39, Line 21: Please correct "net work" to read --network--

Signed and Sealed this

Thirteenth Day of July, 2010

David J. Kappos
*Director of the United States Patent and Trademark Office*